US012621538B2

(12) United States Patent     (10) Patent No.:   US 12,621,538 B2

Walker et al.            (45) Date of Patent:      May 5, 2026

(54) CONTENT TRANSMISSION SYSTEM AND METHOD

(71) Applicant: Sony Interactive Entertainment Inc., Tokyo (JP)

(72) Inventors: Andrew William Walker, London (GB); Richard Downey, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 707 days.

(21) Appl. No.: 17/942,294

(22) Filed: Sep. 12, 2022

(65) Prior Publication Data

US 2023/0078417 A1     Mar. 16, 2023

(30) Foreign Application Priority Data

Sep. 15, 2021    (GB) ..................................... 2113172

(51) Int. Cl.
| H04N 21/654 | (2011.01) |
| H04N 21/81 | (2011.01) |
| H04N 21/854 | (2011.01) |

(52) U.S. Cl.
CPC ....... *H04N 21/654* (2013.01); *H04N 21/8173* (2013.01); *H04N 21/854* (2013.01)

(58) Field of Classification Search
None
See application file for complete search history.

(56) References Cited

U.S. PATENT DOCUMENTS

| 2014/0243082 A1* | 8/2014 | Harris | ..................... A63F 13/86 |
| | | | 463/31 |
| 2019/0282898 A1* | 9/2019 | Perry | ...................... A63F 13/30 |
| 2021/0299581 A1* | 9/2021 | Wu | ........................ A63F 13/332 |

OTHER PUBLICATIONS

Combined Search and Examination Report for corresponding GB Application No. 2113172.7, 9 pages, dated Jun. 22, 2022.
Extended European Search Report for corresponding EP Application No. 22192024.2, 9 pages, dated Oct. 20, 2022.
Examination Report for corresponding GB Application No. 2113172. 7, 4 pages, dated Mar. 19, 2024.

* cited by examiner

*Primary Examiner* — Junior O Mendoza

(74) *Attorney, Agent, or Firm* — Kilpatrick Townsend & Stockton LLP

(57) ABSTRACT

A content encoding system for generating content to be output to a client device, the system comprising a content obtaining unit operable to obtain video content for display at the client device, an asset determining unit operable to determine one or more assets to be associated with the display of the video content at the client device, an asset package identifying unit operable to identify one or more asset packages comprising respective ones of the determined assets, and determining one or more asset package identifiers associated with those packages, and an encoding unit operable to generate an encoded stream comprising the video content and the one or more asset package identifiers.

10 Claims, 6 Drawing Sheets

| Analysis Unit 700 | Asset Package Obtaining Unit 710 | Rendering Unit 720 |
|---|---|---|

| Display Unit 730 |
|---|

Obtain video content
800

Determine assets
810

Identify packages
820

Generate encoded stream
830

CONTENT TRANSMISSION SYSTEM AND METHOD

BACKGROUND OF THE INVENTION

Field of the Invention

This disclosure relates to a content transmission system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With increasing accessibility of high-speed and (at least substantially) unlimited internet access for users, there has been an increase both the supply of and demand for internet-based entertainment content. One example of such content is that of streamed gameplay of a user, or a number of users, such as in a casual or esports environment. Such content may comprise a number of different content elements relating to the gameplay (including video and audio assets), a view of the user (or another person, such as a commentator) and associated audio, and one or more additional elements such as branding and chat functions.

With this large number of content elements, and a demand for high-quality content (such as high-resolution and/or high frame rate imagery), the provision of such content can lead to large bandwidth requirements that are not able to be supported by a significant number of users during transmission of the content to those users. In view of this, it is considered desirable for the size of the transmitted content to be reduced in size where possible.

One solution to this problem that has been implemented in previous arrangements is that of applying a compression algorithm to the audio and/or video that is transmitted. This can enable generated content to be reduced in size sufficiently to enable streaming to users without requiring excessive bandwidth. In some cases, multiple streams may be generated to correspond to different bit rates to enable different stream qualities to be obtained by a user in dependence upon their internet capabilities. Similarly, video encoding formats that enable layers to be selectively obtained have been used such that an adaptive streaming method may be provided.

However, such compression can lead to the introduction of artefacts or other undesirable display properties; these can stem from lossy compression, or simply over compression.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
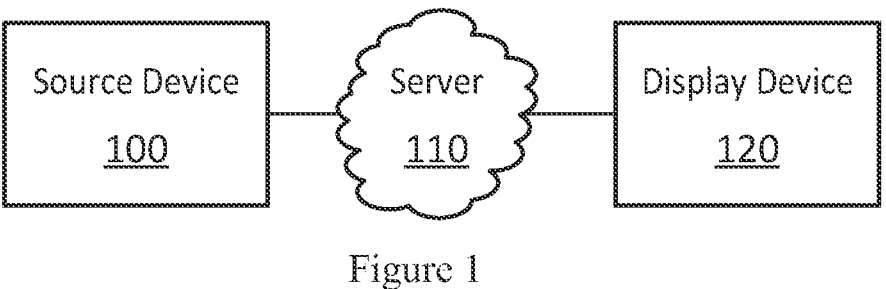
FIG. 1 schematically illustrates a content distribution system.

Referring now to the drawings, wherein like reference numerals designate identical or corresponding parts throughout the several views, embodiments of the present disclosure are described.

FIG. 1 schematically illustrates a content distribution system which is operable to distribute content generated by the user of a first device to a user of a second device via a network connection.

The source device 100 is a device used by a user to generate content for distribution to one or more client devices, such as the display device 120 (of which only one is shown in the Figure, but of course multiple client devices may be configured to receive the content). In some cases the content generation takes place at the source device 100, while in other embodiments at least some of the content generation takes place at a server 110 with the user being able to control that generation via inputs at the source device 100.

The devices 100 and 120 may be any combination of games consoles, computers, mobile devices, or any other type of processing device. These devices may be equipped with any suitable input devices or interfaces; examples include touch screens and games controllers. The devices may also have an associated camera and/or microphone operable to capture images and/or audio of at least the user generating the content for distribution.

The server 110 may be implemented in any suitable fashion; in some cases this may simply be a content distribution network that is operable to distribute content from the source device 100 to one or more client devices 120. Alternatively, or in addition, the server 110 may be configured to generate content (based on inputs from a source device 100), and then distribute this content. Similarly, the server 110 may provide a function of hosting one or more games, a view of which is incorporated into the generated content.

Figure 2:
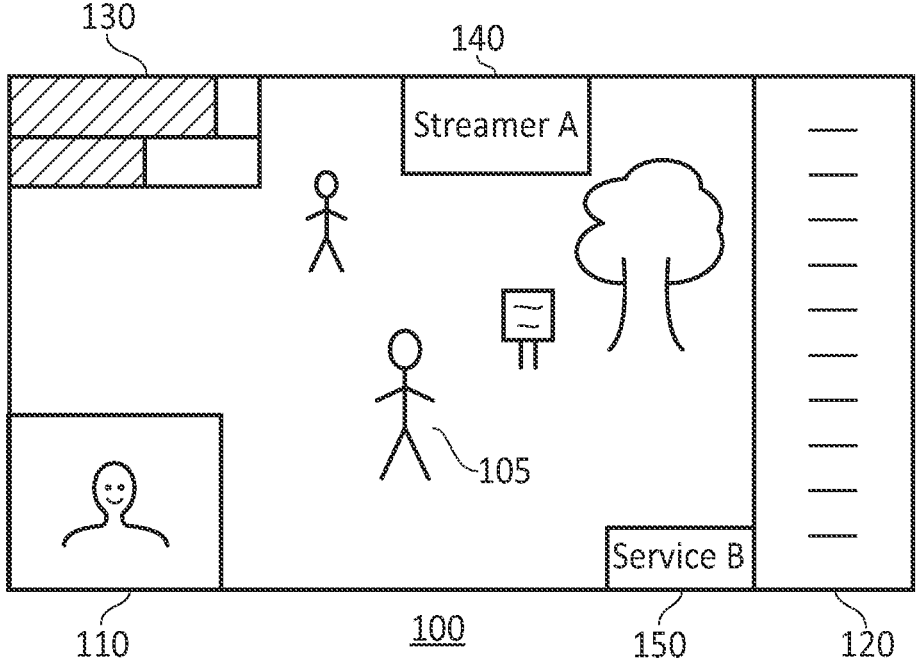
FIG. 2 schematically illustrates an image from distributed content.

FIG. 2 schematically illustrates an exemplary image from content that may be generated by a first user for distribution to a second user. This image comprises a number of different elements, and may have associated audio or the like (not shown) such as haptic feedback or data indicating control information for devices.

The content 100 comprises a number of game elements (such as the character 105), as well as a number of overlaid content elements. While some, such as the UI element 130 (such as a health bar) may be shown in the game itself, others may not be. For instance, a view 110 of the user who is streaming content is provided in the bottom left corner; this may be a video stream that is captured by a camera in the user's environment that is to be overlaid upon the gameplay so as to aid user-audience interactions. Further elements shown in FIG. 2 include a chat window 120 (enabling messages to be sent between spectators, and in some cases the player), the user's personal branding 140 (such as an image or text identifying the user), and branding 150 associated with a particular streaming platform or service. Some or all of these elements (in addition to other elements, where desired) may be displayed in a typical gameplay stream that is viewed by spectators.

In many cases, the non-gameplay elements are overlaid upon the gameplay at the host device such that a complete output is generated by effectively sharing the user's screen. Alternatively, one or more of the elements may be output alongside the video content for overlaying at a server or spectating device. It is considered in embodiments of the present disclosure that it may be advantageous to provide one or more assets to be overlaid in advance of displaying the video content to a viewer. This can enable more network bandwidth to be dedicated to the video content, enabling an improved video quality to be realised for a given bandwidth, as well as a reduction in the amount of data that is transmitted due to the ability to reuse assets where possible.

Figure 3:
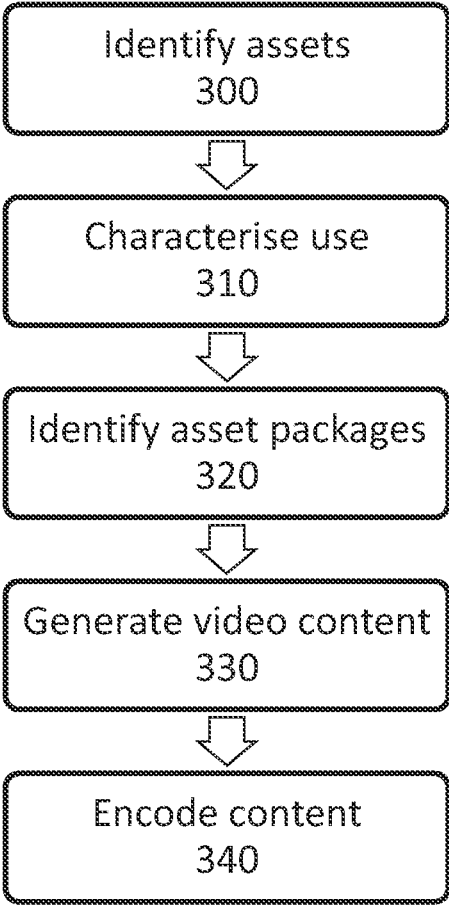
FIG. 3 schematically illustrates a content encoding method.

FIG. 3 schematically illustrates a content encoding method according to embodiments of the present disclosure. This content encoding method may be implemented for content generated by a user that includes any streamed video content, for instance. The below steps may be performed in any suitable order, and may be performed in a substantially overlapping or simultaneous manner; for instance, the identification and characterisation steps may be performed on a live basis so as to be responsive to changes in the content (such as a change in a game that is being streamed).

At a step 300, one or more assets for use in the content are identified. The assets may comprise any suitable audio, video, or still image content as appropriate. Here, suitable refers to assets that are able to be rendered locally by a viewer device rather than at the device of the user generating the content. Examples of such content include overlay content (that is, elements that do not form a part of the content being streamed, such as a video game) and audio content that does not form a part of the content. These are distinct from elements within the streamed content (such as gameplay video), which are rendered at the streamer's device for display at that device.

These assets may be associated with any part of the streamed video content; this can include the content itself (such as a game, with associated elements including identifying images, audio, or user interface elements), overlaid image or video content (such as user branding), overlaid interactive elements (such as chat windows), and/or a video stream of the user. This overlaid content may be any content that is intended to be overlaid during display at a client device, rather than requiring that it is actually overlaid—for instance, a user may indicate which elements are to be overlaid in a stream without actually overlaying them at the streaming device.

In some cases the assets may not be directly representative of the content that is to be reproduced; instead, the assets may be component parts of reproduced content. Examples include fonts to be used for rendering text, or a 'voice pack' which comprises audio clips (such as spoken words or phrases) that are used to provide a voiceover or other audio announcement. This may enable a greater flexibility on the behalf of the end user, for example enabling written content to be customised to a particular user's needs (such as increasing in size or varying colour) or enabling an improved text-to-speech function to be realised.

Similarly, assets may include one or more content filters that are used to change the manner in which audio and/or video content are reproduced at the client device. This enables a content creator to distribute content in a more general form (unfiltered video), whilst enabling viewers to apply filters at the time of viewing so as to achieve the reproduction desired by the content creator. In the case that such a reproduction is not desired by the viewer, for example due to personal preference or visual impairment or the like, the filter may not be applied which enables the more general form to be viewed (or an alternative filter to be applied). This can therefore improve customisability and accessibility of streamed content for viewers.

The identification may be performed using any suitable information; this may include an identity of the user generating the content, an identification of the content itself (such as which game is being played by the user), an identification of optional modules within the content (such as a chat feature), and an identification of the platform upon which the user is streaming their content.

This identification may be based upon information that is provided by the user, for example, or may be derived based upon information about running applications at the user's device (and/or an associated server). Alternatively, or in addition, the identification may be based upon an image analysis performed of display images and/or an analysis of audio associated with the content where appropriate.

At a step 310, the expected use of the identified assets is characterised; this can include a characterisation based upon duration of display of imagery, frequency of re-use of an asset, and/or the type of asset and/or its use. The characterisation should be performed so as to enable the identification of any suitable properties of an asset that indicate the amount it is likely to be displayed and/or the visual impact of the asset. This step may be performed based upon tags associated with assets, asset file locations (such as being located in a folder associated with overlay elements), analysis of an asset (for example, image recognition and/or text analysis), or any other suitable method.

At a step 320, one or more asset packages (that is, a group of one or more assets) are identified that comprise assets identified in step 300 in dependence upon the characterisation of step 310. In some embodiments, this step may comprise the generation of the asset packages, while in other embodiments one or more of the identified asset packages may be pre-existing. In particular, asset packages may be identified (or generated) for those assets which are characterised as being high-use, of a large size, and/or poor candidates for compression based on any suitable parameters. In other words, the asset packages are identified or generated for those assets which offer (for instance) at least a threshold level of benefit when provided in advance of their use instead of at the required time for viewing. This threshold level of benefit, or other criteria, can be selected freely in a given implementation as appropriate; further discussion of this is provided below.

An asset package may be generated so as to comprise only the assets that are identified as being suitable for use in an asset package, or additional assets may also be included. For instance, if a streamer's personal logo is identified as being a suitable asset then an asset package may be generated that comprises a number of assets relating to the streamer's personal branding.

At a step 330, video content is generated by a user; this may comprise computer-generated content such as gameplay of a video game, and/or imagery captured by a camera or the like. Either of both of these video contents may also have associated audio. This video content may comprise one or more overlaid elements, or a number of these may be generated and identified separately for overlay at a later time (such as at a viewer's device).

At a step 340, at least a portion of the video content is encoded along with identifiers (IDs) of one or more asset packages to be provided in association with the video content so as to generate encoded content. This content may comprise one or more files and/or streams as appropriate for a particular application. The encoded video content should be encoded so as to omit the content (or at least to omit a number of instances of the content) corresponding to the identified asset packages, in view of the fact that these assets are to be provided separately.

In some embodiments, this may be a stream in which asset package IDs are provided in a stream header or in a data packet at the start of the stream (or indeed in regular or irregular intervals throughout the stream). Alternatively, a leading data file may be generated that is to be provided prior to accessing a data stream (or further data files) comprising the content itself, with the leading data file comprising asset package IDs.

In addition to this, information about when the assets are to be used may be included in the stream; the stream may also comprise information about how the assets are to be displayed, in some embodiments.

For instance, information specifying a screen location or one or more rules for displaying an asset may be included in the stream and/or in the asset package. This may be particularly suited to overlay content such as a streaming player's branding or a chat window, for instance.

Of course, rather than comprising the asset package IDs it is also considered that the encoded content comprises the asset packages themselves. In other words, the asset packages may be obtained with the encoded content or a separate acquisition (or location, if the assets are already associated with the viewing device) may be performed on the basis of the asset package IDs within the encoded content. In some embodiments, both approaches may be taken for different packages for use with the encoded content.

This encoded content may also comprise information indicating how the assets within the asset packages are to be used in conjunction with the video content. For instance, information identifying a time and location for the display of an asset may be provided; similarly, the encoding may comprise one or more instructions for a decoder to fetch assets to be rendered as a part of the video. Any suitable format for this information may be utilised so as to provide the function of enabling the intended use of the assets contained in the asset packages. Examples include the provision of specific asset control information alongside the asset package identifiers or throughout the video content, and the provision of control information within the video content itself through the use of metadata or the like.

In accordance with the method of FIG. 3, it is therefore considered that a video file or stream is able to be generated in which one or more assets are omitted in favour of information identifying an asset package that is to be obtained by a client device for displaying the file or stream.

These assets may be provided in conjunction with the stream, if required by the client device, but in a modified format rather than appearing within the video file itself.

Figure 4:
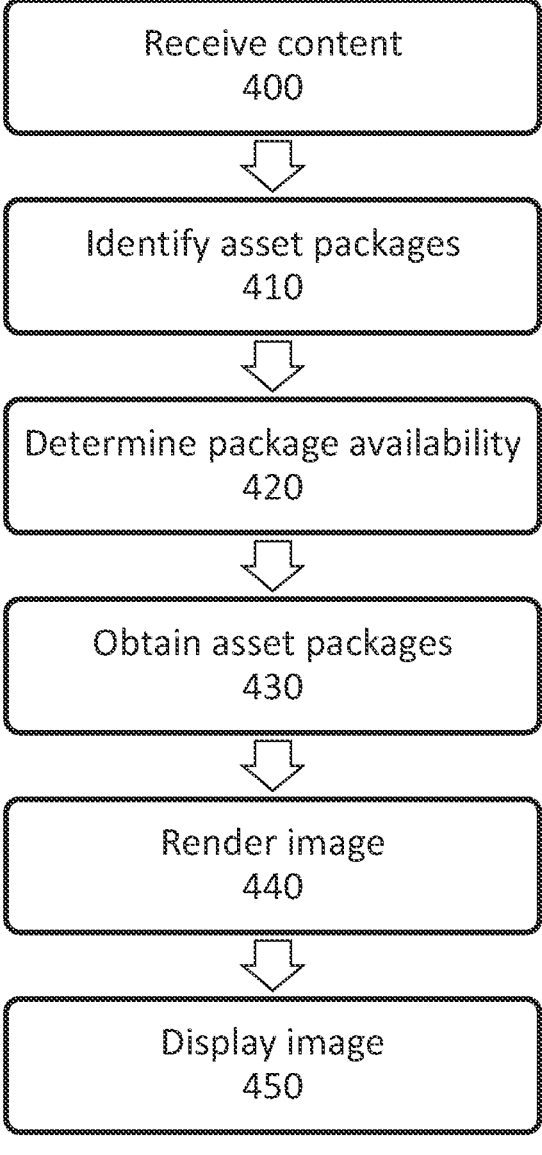
FIG. 4 schematically illustrates an image rendering and display method.

FIG. 4 schematically illustrates an image rendering and display method according to one or more embodiments of the present disclosure. This method may be used to display encoded content generated using the method of FIG. 3.

A step 400 comprises receiving encoded video content comprising one or more asset package identifiers and/or one or more asset packages. This content may be received via a network connection, such as via the internet. In some embodiments this content may be received directly from the streaming user, while in others the content may be accessed via a third-party streaming service such as one associated with a particular games platform or a website that hosts such content.

A step 410 comprises determining the identity of one or more asset packages associated with the received content. This may comprise the identification of any asset packages that are obtained alongside the content, as well as the identification of asset packages that are represented by the asset package identifiers included with the video content. This determination may comprise simply reading an identifying field in an asset package/identifier, or may comprise an analysis of an asset package to determine its contents.

A step 420 comprises determining which of the identified asset packages are available to the client device. That is, of the asset package identifiers included with the video content it is determined which do not correspond to an asset package that is locally available to the client device. This may be performed by searching a client device for a particular asset (indicative of the presence of the package, if the asset is unique to a single asset package) or asset package, or a lookup table or the like indicating locally stored asset packages may be maintained by the client device that is able to be consulted.

It is considered that one or more asset packages may be available at a client by virtue of having been obtained at an earlier date. This may occur in a number of ways; for instance, a user that has already viewed content streamed by a particular viewer may have obtained asset packages associated with the streaming user's branding during the earlier viewing session. Similarly, if a user is viewing a stream comprising gameplay and already has that game installed then one or more asset packages may be available in the installed game files. The same consideration may also apply if the viewer obtains the stream via a streaming client, which may have a number of asset packages already available (such as those associated with a chat function or the like).

A step 430 comprises obtaining asset packages not already available to the client device. Required asset packages may be obtained from a server via the internet, for example. This server may be associated with a particular content (such as a particular game), a platform (such as a games console or associated service), a particular user or group of users, or any other suitable entity. In some embodiments the asset identifier may specify a location from which the asset package may be obtained; this may be in the form of a URL, for example, or an identification of a particular store from which the package can be obtained (with the package being located in the store using the asset package identifier).

In some embodiments, this step may be performed in advance of step 420 while in others it may be performed substantially simultaneously with step 430. This may be dependent upon the excess bandwidth available to the client (so as to enable download alongside the streaming of content at a desired quality), for example. Alternatively, or in addition, the timing of reproduction of assets from amongst the asset packages may be considered—if the assets are not required during an initial viewing period, then it is considered that the asset packages need not be obtained in advance of beginning viewing of the stream.

A step 440 comprises rendering an image for display in dependence upon the encoded video content and one or more assets from the identified asset packages. This may comprise the arranging of one or more video streams and assets in generating an image for display, as well as the generation of associated audio output (which may comprise the use of one or more assets) where appropriate. The arrangement may be determined in dependence upon information provided as a part of the stream or video file, for example, or may be determined by the client in accordance with one or more user inputs or preferences.

A step 450 comprises displaying the rendered image, and presenting any associated audio. This step may be considered optional, in that the rendered images may instead be stored locally for later viewing.

The method of FIG. 4 therefore enables the generation of image content for display in dependence upon the output of a method according to FIG. 3.

Figure 5:
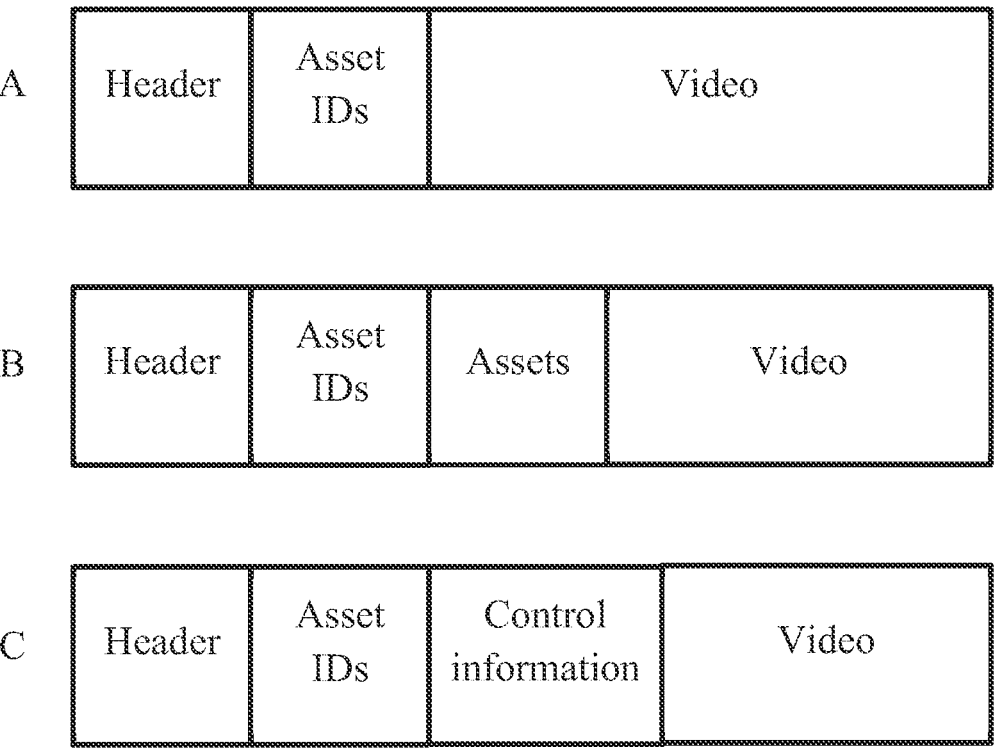
FIG. 5 schematically illustrates a number of exemplary data formats.

FIG. 5 schematically illustrates a number of exemplary data formats that may be utilised in embodiments of the present disclosure. Of course, any number of other formats may be utilised in the delivery of video and asset (and/or asset identifier) data; the examples shown here are provided only to demonstrate a selection of suitable formats. Each of these formats may be considered appropriate for a video stream or for a video file; the feature to be considered is the relative timing of the provision of the asset information and the video data.

Format A is an example of a format in which header and asset ID information is provided in advance of video content. Header information may include any information relating to the file such as format information. The 'asset IDs' field here may refer to the identification of specific assets that are required for the display of the video content in the intended manner, or more broadly to asset packages or a mix of the two. In such a format, the video content may comprise one or more commands to control the display or reproduction of assets indicated in the asset IDs field (for instance, through the use of metadata associated with the video).

Format B is an example of a similar format in which assets (such as in the form of asset packages) are also to be provided in advance of the provision of the video content itself. This may be useful in the case that the assets are newly-generated for the video, and as such are unlikely to be already stored locally. This can also be useful in embodiments in which the identity of asset packages stored at the client device is able to be determined in advance, for instance when transmitting a request to obtain the video content, such that the server providing the video content is able to determine ahead of time whether the asset packages are required. One example of this is that of the client generating a request that identifies all or a selection of locally-stored asset packages; a selection may be determined in dependence upon the content being requested, for example determining a selection corresponding to a particular streamer, game, service, or any other aspect of the content being requested.

Format C illustrates an exemplary format in which control information is provided prior to the video content. This control information is provided so as to provide information to the client device regarding the display of the assets that are to be used. This can include position information for an asset, a display time and/or duration, and transformation information for an asset, for example. Further control information may also be provided at other times during the video content; in some embodiments this is through the user of interleaved video segments and control information packages. Alternatively, or in addition, control information may be provided using other metadata or the like associated with the video content. This control information may comprise specific information about the display of assets, and/or may define a set of rules to guide the display of assets.

While each of the above formats show that the asset information is provided, and then the video information is provided, it is considered that variations in this may also be utilised. For instance, asset information and/or control information may be interleaved with (or interspersed throughout) the video content rather than all being transmitted at the start of the stream/file. This can enable a greater level of control for the content generator, for instance regarding the assets and their location, as well as reducing the latency associated with the obtaining of all of the asset information before beginning the video playback. The asset information (including asset packages, asset IDs, and/or control information relating to assets) may be transmitted at any suitable time within the stream/file; this may include predetermined intervals throughout the stream/file, a predetermined time before the information is needed to generate the correct display at the client, or at times identified in the header or elsewhere within the stream/file.

While in some cases an asset package may be obtained that comprises assets that are not used in the playback of the associated video content, it is considered that the advantages in obtaining the asset package in advance outweigh the inefficiency of obtaining files that are not used. It is also noted that the asset package may be able to be stored and used for the display of other video content at another time, and as such the provision of larger asset packages that include unnecessary assets for some video content may instead represent an overall efficiency gain when considering the content distribution network as a whole. One reason for this is that larger asset packages will likely have less redundancy between asset packages than more specific (smaller) asset packages, as to provide smaller packages with less redundancy will increase the overall number of packages significantly.

Figure 6:
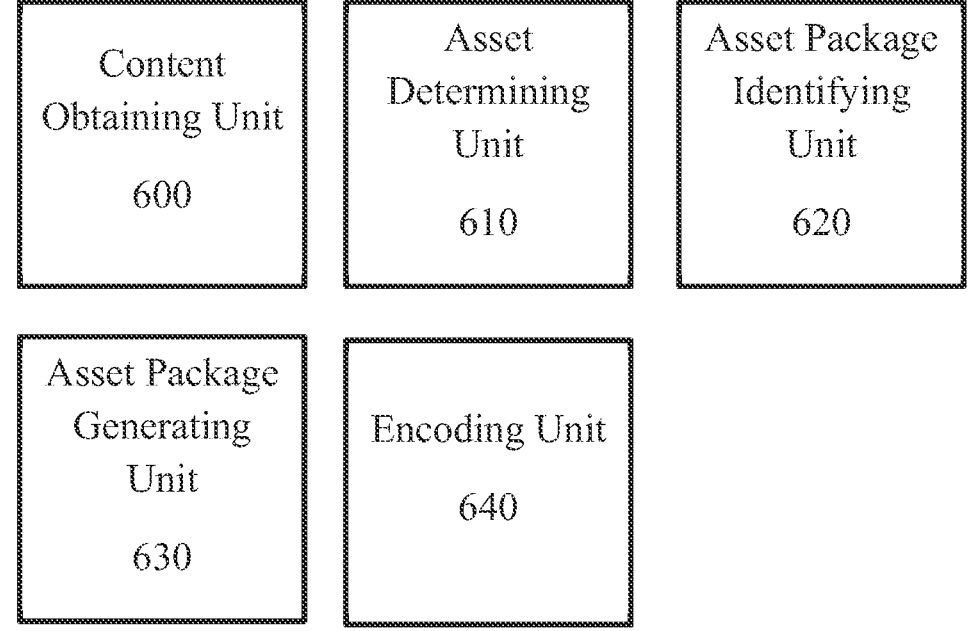
FIG. 6 schematically illustrates a content encoding system.

FIG. 6 schematically illustrates a content encoding system for generating content to be output to a client device, the system comprising a content obtaining unit 600, an asset determining unit 610, an asset package identifying unit 620, an optional asset package generating unit 630, and an encoding unit 640.

The content obtaining unit 600 is operable to obtain video content for display at the client device. This video content may comprise any content to be streamed by a user, such as video of the user playing a computer game or using another application on a computer or games console. Further video content to be displayed may also be obtained, which may include any overlaid video—examples include a picture-in-picture style display of other video content, and a video feed captured by a camera which includes images of the user. It is therefore apparent that the video content may comprise gameplay video and/or video of a player of a video game.

The asset determining unit 610 is operable to determine one or more assets to be associated with the display of the video content at the client device. This determination may be performed in any suitable manner; this may include information provided by a user (such as information identifying a game being played), information about the user, information about the platform being used to stream content, and any other information relating to the video content or its distribution. The assets may comprise one or more images, videos, fonts, content filters, and voice and/or audio segments in any combination; examples of such assets are described above.

The asset package identifying unit 620 is operable to identify one or more asset packages comprising respective ones of the determined assets, and determining one or more asset package identifiers associated with those packages. The asset package identifiers may further comprise information to enable the client device to obtain a corresponding asset package; this may include information in a format compatible with an asset package store or repository to facilitate access, or a URL or the like to directly identify the location of the asset package.

The optional asset package generating unit 630 is operable to generate one or more asset packages each comprising at least a subset of the assets to be associated with the display of the video content at the display device. This may be performed in the case that new assets have been generated for a particular stream (such as new logos for a streamer, or a new game being played), for instance, such that an appropriate asset package does not already exist. Similarly, a new asset package may be generated in the case that existing asset packages are deemed inappropriate for use with the present content; for instance, if a small number of assets from each of a large number of asset packages were required then it may be considered appropriate to generate a new, more specific, asset package.

The encoding unit 640 is operable to generate an encoded stream comprising the video content and the one or more asset package identifiers. This encoding may comprise any suitable method for generating an output stream comprising at least the desired video content, asset identifier information, and any desired control information (for the reproduction of assets) or the like that may be included. That is to say that the encoding unit 640 may be operable to encode information regarding the reproduction of the one or more assets at the client device, in which the information may comprise one or more of an asset identifier, transform information, position, pan, and/or duration for one or more of the assets. In some embodiments the encoding unit 640 is operable to encode one or more asset packages in the encoded stream; this may be performed in dependence upon information about whether the asset packages are likely to be required at a client device, for instance.

In a number of embodiments, the encoding unit 640 is configured to arrange one or more of the asset packages so as to occur earlier in the stream than the video content. Alternatively, or in addition, the asset packages (or indeed asset package identifiers) may be provided so as to be interspersed throughout the video content.

The arrangement of FIG. 6 is an example of a processor (for example, a GPU and/or CPU located in a games console or any other computing device) that is operable to generate content to be output to a client device, and in particular is operable to:

obtain video content for display at the client device;
    determine one or more assets to be associated with the display of the video content at the client device;
    identify one or more asset packages comprising respective ones of the determined assets, and determining one or more asset package identifiers associated with those packages; and generate an encoded stream comprising the video content and the one or more asset package identifiers.

Figures 7, 8:
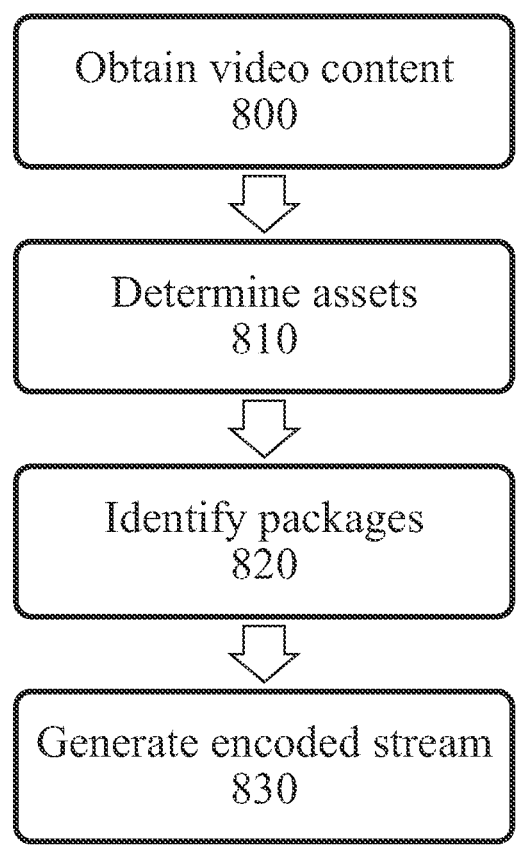
FIG. 7 schematically illustrates a content decoding system.
FIG. 8 schematically illustrates a content encoding method.

FIG. 7 schematically illustrates a content decoding system operable to generate images for display in dependence upon an obtained encoded stream comprising video content and one or more asset package identifiers, the system comprising an analysis unit 700, an asset package obtaining unit 710, a rendering unit 720, and an optional display unit 730.

The analysis unit 700 is operable to identify one or more required asset packages in dependence upon the asset package identifiers included in the obtained encoded stream. This process may be performed dynamically throughout viewing of the content in the case that asset package identifiers are transmitted throughout the content.

The asset package obtaining unit 710 is operable to obtain the identified asset packages. The asset package obtaining unit may be operable to obtain identified asset packages from online data storage and/or from local storage; in other words, the packages need not be obtained from a remote source. Of course, this step may be skipped in the case that the encoded stream comprises the asset packages.

The rendering unit 720 is operable to generate one or more images for display comprising the video content and one or more assets from the obtained asset packages. This rendering may be performed in accordance with local rules or user preferences for arranging assets or rules associated with a particular platform used for receiving the encoded video content (such as a particular streaming application).

Alternatively, or in addition, the rendering may be performed in accordance with control information relating to the reproduction of assets as included in the encoded stream.

The optional display unit 720 is operable to display the generated images output by the rendering unit 720; this functionality is considered optional in that the content may be assembled to generate images for display and then stored for future viewing.

The arrangement of FIG. 7 is an example of a processor (for example, a GPU and/or CPU located in a games console or any other computing device) that is operable to generate images for display in dependence upon an obtained encoded stream comprising video content and one or more asset package identifiers, and in particular is operable to:

identify one or more required asset packages in dependence upon the asset package identifiers;
    obtain the identified asset packages; and
    generate one or more images for display comprising the video content and one or more assets from the obtained asset packages.

In an exemplary embodiment, a user is able to stream a video of their gameplay in conjunction with personal branding and a camera feed of them playing the game. Rather than generating an encoded video stream in which each of the elements have already been composited, an encoded stream is generated in which the video content is provided (the gameplay and the camera feed) along with identifiers of one or more asset packages. These asset packages correspond to the user's personal branding, in which the assets may be logos, other imagery, and/or audio elements associated with that user. Further asset packages may also be generated that correspond to the game being played, such as UI elements (including scoreboards), which may be easily separated from the user's gameplay video or otherwise not present in that video.

Once the applicable asset packages have been identified, the encoded stream is generated for distribution and sent to spectators directly or via a video hosting or streaming server (for example). Spectators are then able to decode the stream and generate images for display. This may include combining video elements (such as overlaying the camera feed upon the gameplay, if the videos are provided separately to one another), as well as arranging other assets such as logos. This combining/arranging may be performed in dependence upon information included in the encoded stream that specifies how the final image should look (such as defining a display location for a logo), and/or in dependence upon spectator preferences or the like. In the case that the assets comprise audio, it is considered that the rendering process can also include reproducing the audio; this may also be influenced by local rules or preferences, such that a user may have greater control over the audio reproduction (for instance, in enabling a user to have more control over the relative volume of different audio content).

As noted above, in embodiments of the present disclosure it is considered advantageous that assets are able to be obtained in advance of their use in the video content; this can reduce the bandwidth required for transmitting the content, which can lead to reduced stream sizes or an increase in the quality of the video content for a given bandwidth (as compression need not be so aggressive). The provision of assets in advance can also allow for higher-quality assets to be provided, as bandwidth constraints and compression need no longer be as significant a consideration.

FIG. 8 schematically illustrates a content encoding method for generating content to be output to a client device.

A step 800 comprises obtaining video content for display at the client device.

A step 810 comprises determining one or more assets to be associated with the display of the video content at the client device.

A step 820 comprises identifying one or more asset packages comprising respective ones of the determined assets, and determining one or more asset package identifiers associated with those packages.

A step 830 comprises generating an encoded stream comprising the video content and the one or more asset package identifiers.

Figure 9:
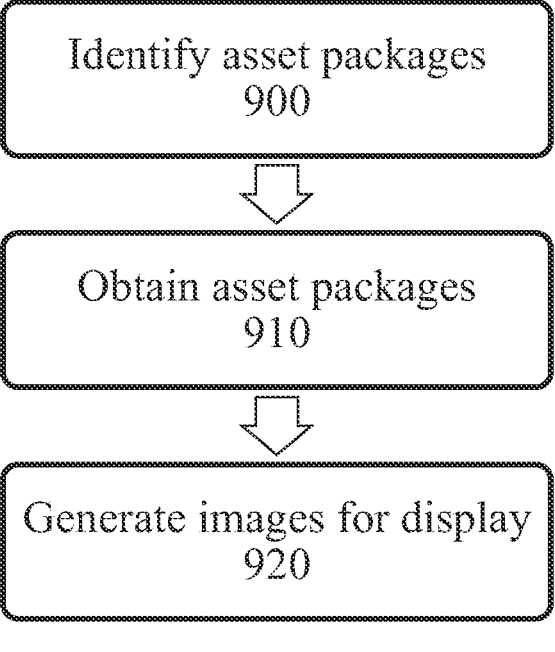
FIG. 9 schematically illustrates a content decoding method.

FIG. 9 schematically illustrates a content decoding method for generating images for display in dependence upon an obtained encoded stream comprising video content and one or more asset package identifiers.

A step 900 comprises identifying one or more required asset packages in dependence upon the asset package identifiers.

A step 910 comprises obtaining the identified asset packages.

A step 920 comprises generating one or more images for display comprising the video content and one or more assets from the obtained asset packages.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A content encoding system for generating content to be output to a client device, the system comprising:
 a content obtaining unit operable to obtain video content for display at the client device;
 an asset determining unit operable to determine one or more assets to be associated with the display of the video content at the client device;
 an asset package identifying unit operable to identify one or more asset packages comprising respective ones of the determined assets, and determining one or more asset package identifiers associated with those packages; and
 an encoding unit operable to generate an encoded stream comprising the video content and the one or more asset package identifiers.

2. A system according to clause 1, comprising an asset package generating unit that is operable to generate one or more asset packages each comprising at least a subset of the assets to be associated with the display of the video content at the display device.

3. A system according to any preceding clause, wherein the assets comprise one or more images, videos, fonts, content filters, and voice and/or other audio segments.

4. A system according to any preceding clause, wherein the encoding unit is operable to encode information regarding the reproduction of the one or more assets at the client device.

5. A system according to clause 4, wherein the information comprises one or more of an asset identifier, transform information, position, pan, and/or duration.

6. A system according to any preceding clause, wherein the video content comprises gameplay video and/or video of a player of a video game.

7. A system according to any preceding clause, wherein the asset package identifiers comprise information to enable the client device to obtain a corresponding asset package.

8. A system according to any preceding clause, wherein the encoding unit is operable to encode one or more asset packages in the encoded stream.

9. A system according to clause 8, wherein the encoding unit is configured to arrange one or more of the asset packages so as to occur earlier in the stream than the video content.

10. A content decoding system operable to generate images for display in dependence upon an obtained encoded stream comprising video content and one or more asset package identifiers, the system comprising:
 an analysis unit operable to identify one or more required asset packages in dependence upon the asset package identifiers;
 an asset package obtaining unit operable to obtain the identified asset packages; and
 a rendering unit operable to generate one or more images for display comprising the video content and one or more assets from the obtained asset packages.

11. A system according to clause 10, wherein the asset package obtaining unit is operable to obtain identified asset packages from online data storage and/or from local storage.

12. A content encoding method for generating content to be output to a client device, the method comprising:

obtaining video content for display at the client device;

determining one or more assets to be associated with the display of the video content at the client device;

identifying one or more asset packages comprising respective ones of the determined assets, and determining one or more asset package identifiers associated with those packages; and generating an encoded stream comprising the video content and the one or more asset package identifiers.

13. A content decoding method for generating images for display in dependence upon an obtained encoded stream comprising video content and one or more asset package identifiers, the method comprising:

identifying one or more required asset packages in dependence upon the asset package identifiers;

obtaining the identified asset packages; and generating one or more images for display comprising the video content and one or more assets from the obtained asset packages.

14. Computer software which, when executed by a computer, causes the computer to carry out the method of clauses 12 or 13.

15. A non-transitory machine-readable storage medium which stores computer software according to clause 14.

The invention claimed is:

1. A content encoding system for generating content to be output to a client device, the system comprising:

a content obtaining unit operable to obtain video content for display at the client device;

an asset determining unit operable to determine a first set of assets to be associated with the display of the video content at the client device;

an asset package identifying unit operable to identify a first asset package comprising the first set of assets, and determining a first set of asset package identifiers associated with the first asset package; and an encoding unit operable to generate a first encoded stream comprising the video content and the first set of asset package identifiers, wherein, when new assets are generated for the video content, the asset determining unit is further operable to determine a second set of assets to be associated with the display of the video content at the client device, the second set of assets including the new assets, the asset package identifying unit is further operable to identify a second asset package comprising the second set of assets and determining a second set of asset package identifiers associated with the second asset packages, and the encoding unit is further operable to generate a second encoded stream comprising the video content and the second set of asset package identifiers.

2. The system of claim 1, comprising an asset package generating unit that is operable to generate at least one of the first and second packages.

3. The system of claim 1, wherein the assets comprise at least one of images, videos, fonts, content filters, voice, and audio segments.

4. The system of claim 1, wherein the encoding unit is operable to encode information regarding the reproduction of the first and second assets at the client device.

5. The system of claim 4, wherein the information comprises at least one of an asset identifier, transform information, position, pan, and duration.

6. The system of claim 1, wherein the video content comprises at least one of gameplay video and video of a player of a video game.

7. The system of claim 1, wherein the asset package identifiers comprise information to enable the client device to obtain a corresponding asset package.

8. The system of claim 1, wherein the encoding unit is operable to encode the first and second asset packages in the encoded stream.

9. The system of claim 8, wherein the encoding unit is configured to arrange the first and second asset packages so as to occur earlier in the stream than the video content.

10. A content encoding method for generating content to be output to a client device, the method comprising:

obtaining video content for display at the client device;

determining a first set of assets to be associated with the display of the video content at the client device;

identifying a first asset package comprising the first set of assets, determining a first set of asset package identifiers associated with the first asset package; and generating a first encoded stream comprising the video content and the first set of asset package identifiers, wherein, when new assets are generated for the video content, the method further comprising determining a second set of assets to be associated with the display of the video content at the client device, the second set of assets including the new assets identifying a second asset package comprising the second set of assets, determining a second set of asset package identifiers associated with the second asset packages, and generating a second encoded stream comprising the video content and the second set of asset package identifiers.

* * * * *